Feb. 1, 1966    A. G. STIMSON    3,232,193
CAMERA BATTERY TEST INDICATOR
Filed March 18, 1963    4 Sheets-Sheet 1
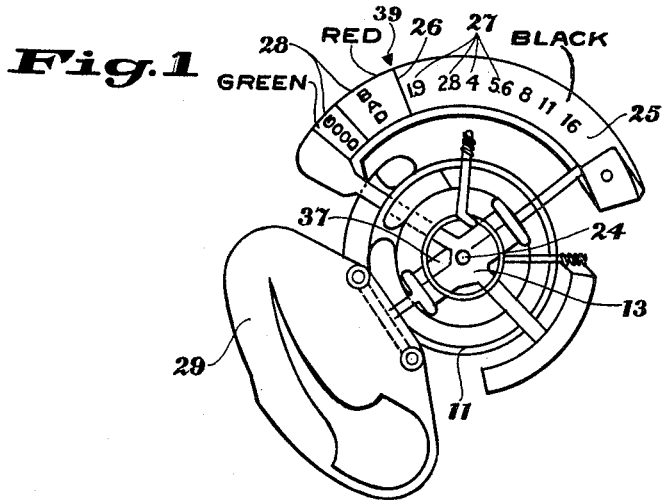
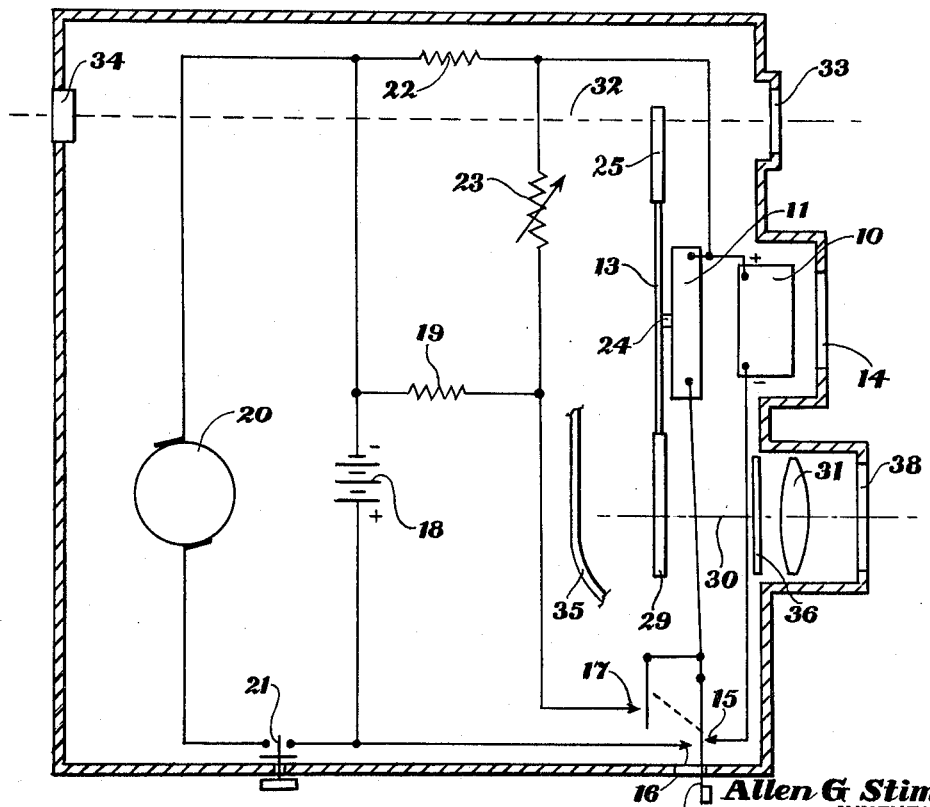
Allen G. Stimson
INVENTOR.
BY R. Frank Smith
Eugene S. Stephens
ATTORNEYS Feb. 1, 1966    A. G. STIMSON    3,232,193
CAMERA BATTERY TEST INDICATOR
Filed March 18, 1963    4 Sheets-Sheet 2

*Allen G. Stimson*
INVENTOR.

BY *R. Frank Smith*
*Eugene S. Stephens*
ATTORNEYS

Feb. 1, 1966 A. G. STIMSON 3,232,193
CAMERA BATTERY TEST INDICATOR
Filed March 18, 1963 4 Sheets-Sheet 3
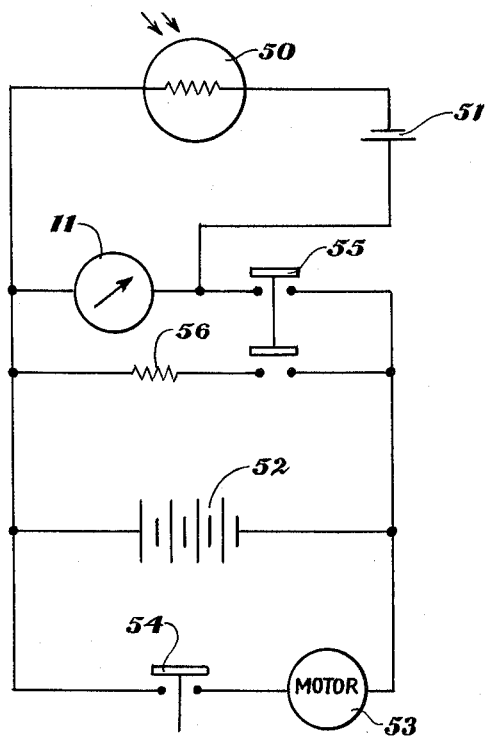
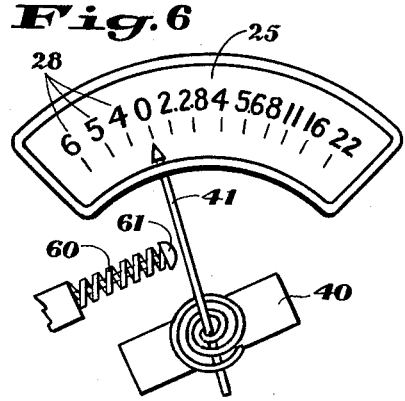
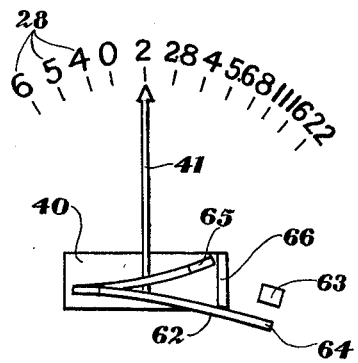
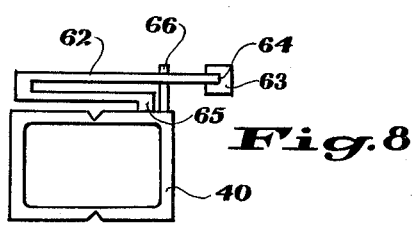
Allen G. Stimson
INVENTOR.
BY R. Frank Smith
Eugene S. Stephens
ATTORNEYS Feb. 1, 1966  A. G. STIMSON  3,232,193
CAMERA BATTERY TEST INDICATOR
Filed March 18, 1963  4 Sheets-Sheet 4
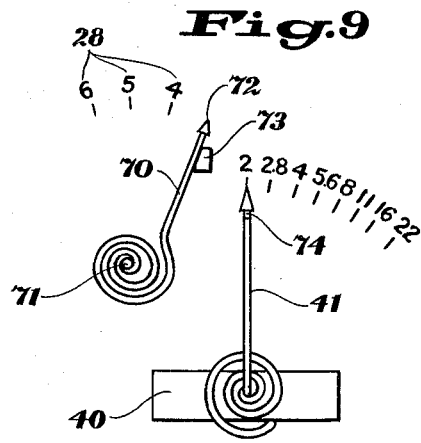
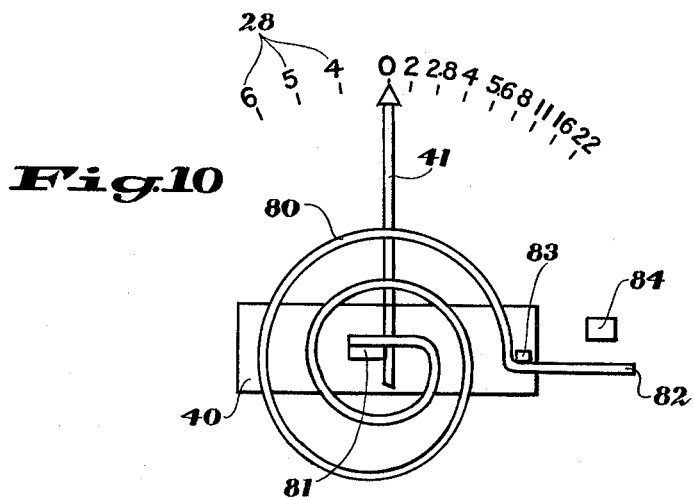
Allen G. Stimson
INVENTOR.
BY R. Frank Smith
Eugene S. Stephens
ATTORNEYS United States Patent Office 3,232,193
Patented Feb. 1, 1966

3,232,193
CAMERA BATTERY TEST INDICATOR
Allen G. Stimson, Rochester, N.Y., assignor to Eastman Kodak Company, Rochester, N.Y., a corporation of New Jersey
Filed Mar. 18, 1963, Ser. No. 265,673
11 Claims. (Cl. 95—10)

This application is a continuation-in-part of my copending application, Serial No. 206,419, filed June 29, 1962, and since abandoned.

The present invention relates to a dual functioning of an electric measuring instrument in a camera's exposure control system, and more particularly to means whereby such electrical measuring instrument may be used for indicating unambiguously either the electrical potential available from a camera battery or a function of scene light as sensed by a photoresponsive device.

One of the objects of this invention is to indicate the potential difference across a camera battery by means of the electric measuring instrument which normally functions in the camera's exposure control system for indicating scene light.

A further object of the invention is to indicate battery potential on a scale separate from the scale for indicating a function of scene light, each scale cooperating with the same electric measuring instrument.

Another object of the invention is to economize on electrical measuring instruments by indicating camera battery potential by means of the same instrument used in the camera's exposure meter, and yet keep the indications distinct and unambiguous.

An additional object of this invention is to display separately in a viewfinder of a camera indications of camera battery potential and film exposure indicia or light value.

These and other objects of the invention are accomplished by connecting a camera's electrical measuring instrument selectively across the camera's battery and photoresponsive device. With respect to the instrument, the polarity of the photoresponsive device is opposite to that of the battery with the result that the instrument's moving member deflects in opposite directions from a reference point with respect to the two connections. Scale indicia cooperating with the moving member are arranged for indicating battery potential when the master deflects in one direction from the reference point, and indicating a function of scene light when the member deflects in the other direction from the reference point. Thus, the two indicating functions of the instrument are kept separate and clearly readable, so as to avoid any ambiguity.

The invention will be better understood by reference to the drawings wherein:

FIG. 1 shows a front view of a movable member of an electric measuring instrument provided with scale indicia according to the invention;

FIG. 2 shows a partially schematic, partially sectioned side view of the invention including a circuit diagram associated with typical camera elements;

FIG. 5 shows a schematic circuit diagram of an alternative embodiment of the invention; and FIGS. 6–10 show front and side views of spring arrangements for resisting deflection of a movable member of an electric instrument in response to a test of battery voltage.

Figure 3:
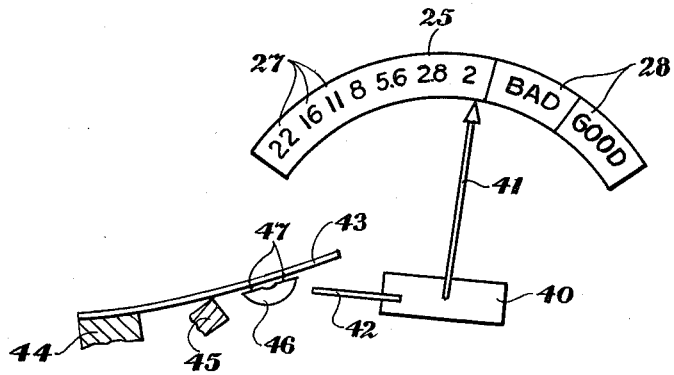
FIGS. 3 and 4 show a partially schematic front view of a device for resisting deflection of a movable member of an electric instrument in response to a test of battery voltage.

Referring to FIG. 2, a photoresponsive device 10, such as a photoelectric cell, phototransistor, photovoltaic cell, or photoresistive cell is arranged to be illuminated by scene light through window 14 and is electrically connected in circuit with an electrical measuring instrument 11 through a two-position switch 12 which is normally closed when engaging contact 15 in the position illustrated in FIG. 2. Through such a circuit a movable member 13 of the instrument 11 is deflectable as a function of scene brightness in response to the photoresponsive device 10 as is well known in the exposure control art.

By moving switch 12 from its normal position to its second position in which it engages contacts 16 and 17, the circuit is opened between the photoresponsive device 10 and the instrument 11, and a battery 18 is placed in circuit with the instrument 11 for purpose of measuring the potential difference across the battery. A load is imposed on the battery 18 by shunting resistor 19, through contacts 17 and 16, which is the equivalent of the normal load of a camera drive motor 20, which is in circuit with battery 18 through trigger switch 21.

The value of resistance 22 is selected to cause the approximate desired deflection of member 13. Variable resistance 23 shunts the instrument 11 and is used for precise adjustment of the deflection of member 13.

With respect to the instrument 11, the electrical polarity of the battery 18, and the photoresponsive device 10, are opposite and hence each causes the member 13 to deflect in an opposite direction from a reference point or zero point at which the member rests when not connected across a potential difference.

FIG. 1 shows an embodiment of the deflecting member 13 adapted for indicating according to this inventoin. By means of a shaft 24, the member 13 is fixed to a rotationally movable coil 37 of the instrument 11, which coil is arranged for moving or deflecting as a function of scene light in response to the photoresponsive device 10 (FIG. 2), as is well known in the exposure meter art. A scale 25, fixed to member 13 cooperates with fixed mark 39, and is provided with a reference or zero point 26, film exposure indicia or light value indicia 27, and battery potential indicia 28. The exposure indicia 27 comprise f-stop numbers corresponding to sensed scene brightness, and the battery potential indica 28 comprise red and green areas respectively labeled "bad" and "good" corresponding to insufficient and sufficient potential for continued use of the battery.

Of course the scale 25 may be transferred to the camera body, and a pointer may move with the deflecting member of the instrument, or the indicia on the scale may be altered.

From the scale reference point 26, the scale deflects counterclockwise through f-stop indicia 27 as a function of sensed scene light when the instrument 11 is in circuit with the photoresponsive device 10 as shown in FIG. 2. From the reference point 26, the scale deflects clockwise through the potential indicia 28 as a function of battery potential when the instrument 11 is in circuit with battery 18.

A diaphragm vane 29 may also be fixed to member 13 so as to move as a function of scene light for automatically adjusting an exposure value as is well known in the exposure control art.

As shown in FIG. 2, the deflecting member 13, fixed to the instrument 11 by means of the shaft 24, is so disposed that the scale 25 moves through the path 32 of light in a camera viewfinder represented generally by a window 33 and an eyepiece 34. This enables the scale 25 to be viewed in the camera viewfinder. Also, the diaphragm vane 29, for regulating the amount of light falling on filmstrip 35, is arranged for moving through the light path 30 of a taking lens system represented generally by a shutter 36, an aperture 38 in the camera wall, and a lens 31.

In operation, whenever a battery test is desired, switch 12 is moved to its second position away from contact 15 and into engagement with contacts 16 and 17. Deflection of member 13 will then occur as a function of battery potential, and because of the polarity of the battery connection, such deflection will move scale indicia 28 into view in the viewfinder. When the test is complete and switch 12 is returned to its normal position as illustrated in FIG. 1 the instrument 11 is connected in circuit with the photoresponsive device 10 and member 13 is deflected as a function of sensed scene light. The polarity of the signal from the photoresponsive device 10 is opposite to that of the battery 18 with respect to the instrument 11 so that the deflection of member 13 moves indicia 27 into view in the viewfinder.

Figure 4:
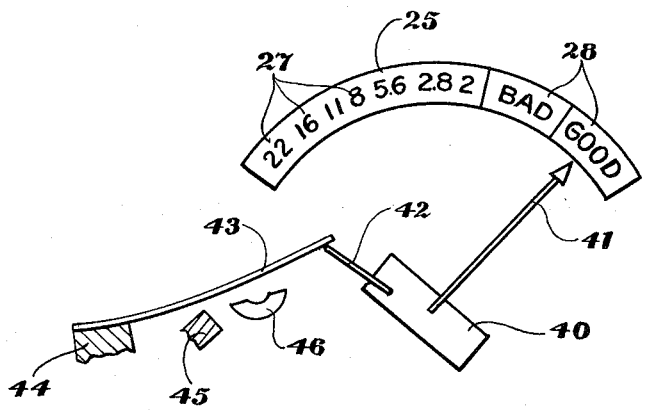

In FIGS. 3 and 4 is shown a deflection resistant torque device for producing indications clearly distinguishable as between adequate and inadequate battery voltages. A movable or deflectable coil 40 of the instrument 11 is provided with a pointer 41 for cooperating with fixed scale 25 which is provided with film exposure indicia 27 and battery voltage indicia 28. An arm 42 is fixed to movable coil 40 and arranged for engaging spring 43 upon deflection of coil 40 in response to battery voltage. Spring 43, which is fixed to the camera at support 44 and biased toward engagement with stop 45, is formed of a magnetic material, and a permanent magnet 46 is arranged for attracting spring 43 toward stop 45. When spring 43 rests against stop 45, a magnetic gap at points 47 separates magnet 46 and spring 43.

The combination of spring tension and magnetic attraction holding spring 43 against stop 45 is selected so that deflection of coil 40 in response to inadequate battery voltages is insufficient to force spring 43 away from magnet 46. Conversely, deflection of coil 40 in response to adequate battery voltages is sufficient to force spring 43 away from magnet 46 and thus widen the magnetic gap 47 and reduce the force of magnetic attraction. Such reduction in magnetic attraction allows coil 40 to deflect further against the effective resistance of only spring 43. Thus, coil 40 and pointer 41 deflect over a relatively large angular distance in response to battery voltages that are slightly less or slightly more than adequate, and the results of a battery test are more definitely apparent to the camera operator. Of course, indicating means or spring arrangements other than spring 43 may be employed for resisting deflection occurring after the magnetic gap 47 is widened.

An alternative and simplified electric circuit for accomplishing the invention is shown in FIG. 5. Such a circuit allows testing of a battery without disconnecting the photoresponsive element from the electric measuring instrument, because current through the instrument in response to battery voltage is of sufficient relative magnitude to overpower current in response to illumination of the photocell.

A photoconductive cell 50 powered by battery 51 is connected across electric measuring instrument 11. A camera drive battery 52 electrically connected with camera drive motor 53 is arranged for powering motor 53 upon closing of switch 54. To test the voltage of battery 52, switch 55 is closed so as to connect the battery across instrument 11 and resistor 56 which simulates the electrical load of motor 53. Since camera battery testing is not undertaken while drive motor 53 is operating, switch 54 is open. The polarity of batteries 51 and 52 with respect to instrument 11 is opposed so as to produce respectively opposite deflections of the instrument's movable member.

In a typical exposure control system employing a photoconductive cell such as cell 50, currents through instrument 11 in response to illumination of cell 50 are in the microampere range, for example, 200–300 microamperes. The movable coils of electric measuring instruments commonly used in exposure control systems can accommodate much larger currents without damage to the instrument. Accordingly, current through instrument 11 in response to the voltage of battery 52 is arranged to fall in the milliampere range, for example, 1–2 milliamperes, and can be even higher. Thus, the deflecting torque of instrument 11 in response to a test of the voltage of battery 52 is many times as great as the opposite deflecting torque in response to illumination of cell 50 so that varying levels of illumination of cell 50 play a very insignificant part in the total instrument deflection, and the electric signal in response to battery 52 overpowers the electric signal in response to cell 50. Utilization of such a comparatively more powerful deflecting torque during battery testing enables a battery test to be accomplished without disconnecting cell 50 from instrument 11. This eliminates a switch and also enables use of a greater variety of deflection resisting torque means, such as those shown in FIGS. 6–10, for varying the scale characteristics of the instrument for battery test deflection.

FIG. 6 shows a deflection resistant spiral spring 60 having a contact tip 61 for engaging pointer 41 which is fastened to coil 40 of electric measuring instrument 11. Coil 40 is arranged in circuit with battery 52 (FIG. 5) for deflecting counterclockwise in response to battery voltage. Such deflection moves pointer 41 over battery voltage indicia 28 of scale 25.

FIGS. 7 and 8 show another spring arrangement for resisting deflection in response to a test of battery voltage. Cantilever spring 62 has a fixed end 65 fastened to coil 40 and a free end 64. The effective length of spring 62 is increased by its having two arms doubling back on one another. Spring 62 is biased to rest against stop 66 which is fastened to coil 40. Spring 62 resists counterclockwise deflection of coil 40 in response to battery voltage for moving pointer 41 over battery voltage indicia scale 28, because its free end 64 is arranged for engaging the abutment 63 which is fixed to the camera.

In FIG. 9 is shown a helical or spiral spring 70 having a fixed end mounted on support 71 which is fastened to the camera body and a free end 72 formed as a pointer. The bias of spring 70 is such that the free end 72 rests against stop 73. A downwardly extending projection 74 formed on pointer 41, which is fastened to movable coil 40, is arranged for engaging spring 70 upon deflection of coil 40 in a counterclockwise direction in response to a battery voltage test. Pointer 41 is arranged to pass freely over spring 70, which is engaged only by downwardly projecting member 74. Thus, counterclockwise deflection of coil 40 in response to a battery voltage test causes projection 74 to drive the pointer end 72 of spring 70 across battery voltage indicia scale 28 to an extent dependent upon battery voltage.

FIG. 10 shows a helical or spiral spring 80 having its innermost end fixed to support 81 which is mounted on coil 40. The free end 82 of spring 80 extends beyond limit stop 83 fixed to coil 40, and is arranged for engaging abutment 84 fixed to the camera body when coil 40 deflects counterclockwise in response to a test of battery voltage. Spring 80 thus resists such deflection and causes pointer 41 to be positioned on battery voltage scale 28 in accordance with battery voltage.

The invention has been described in detail with particular reference to preferred embodiments thereof, but it will be understood that variations and modifications can be effected within the spirit and scope of the invention as described hereinabove and as defined in the appended claims.

I claim:

1. In a photographic camera having an electric battery and a photoresponsive device illuminatable by scene light, the combination comprising: an electric measuring instrument having a member movably mounted for deflection in two directions from a reference position; a pointer and scale, one of which is movable with said member for indicating a deflected position of said member relative to said reference position, said pointer and scale being visible to the camera operator; circuit means carried by said camera and including means for electrically connecting said photoresponsive device to said instrument independently of said battery and with such polarity as to cause deflection of said member from said reference position in a first one of said directions in response to scene light; said circuit means including means for electrically connecting said battery to said instrument with opposite polarity so as to cause deflection of said member from said reference position in the second one of said direction in response to the difference of potential across said battery; film exposure indicia arranged on a first portion of said scale corresponding to deflected position of said member in said first direction from said reference position; and electrical potential indicia arranged on a second portion of said scale corresponding to deflected positions of said member in said second direction from said reference position.

2. The combination of claim 1 wherein said camera has an electric drive motor, and said battery is electrically in circuit with said motor.

3. The combination of claim 1 wherein a diaphragm vane is arranged for moving with said member.

4. The combination of claim 1 wherein said electrical connection between said photoresponsive device and said instrument is interrupted whenever said instrument is connected with said battery for said second direction deflection.

5. In a photographic camera having a source of electrical potential and an exposure control system including a photoresponsive element illuminatable by scene light and an electric measuring instrument, means for connecting said instrument electrically in circuit with said element independently of said source, said instrument having a movable member which, when said instrument is so connected, assumes a predetermined position in the absence of illumination of said element, and which is deflectable from said position in a first direction in response to illumination of said element, the improvement comprising means for measuring the voltage of said source, including means for selectively connecting said instrument with said source with such polarity as to deflect said member from said position in the opposite direction to an extent dependent upon the voltage of said source.

6. The improvement comprising according to claim 5 wherein said selective connecting means includes a switch means operable for electrically disconnecting said element from said instrument whenever said selective connection is made.

7. The improvement comprising according to claim 5 further comprising scale and pointer means, one of which is movable in response to deflection of said member in said second direction for indicating voltage of said source.

8. The improvement comprising according to claim 7 wherein said camera has a viewfinder and said scale and pointer are visible in said viewfinder.

9. In a photographic camera having a source of electrical potential and an exposure control system including a photoresponsive element illuminatable by scene light and an electric measuring instrument, means for connecting said instrument electrically in circuit with said element, said instrument having a movable member, which when said instrument is so connected, is deflectable in a first direction as a function of illumination of said element, means for measuring the voltage of said source comprising: means for selectively connecting said instrument with said source to deflect said member in a second direction opposite said first direction to an extent dependent upon the voltage of said source, movable deflection resistant means having a reference position and adapted to oppose deflection of said member in said second direction, magnetic means adapted to attract said deflection resistant means toward said reference position, means located on said deflectable member and adapted to engage with said deflection resistant means and to urge said deflection resistant means against the force of the magnetic attraction when said deflectable member is deflected in said second direction, and scale and pointer means, one of which is movable in response to deflection of said deflectable member in said second direction for indicating the voltage of said source.

10. In a photographic camera having a source of electrical potential and an exposure control system including a photoresponsive element illuminatable by scene light and an electric measuring instrument, means for connecting said instrument electrically in circuit with said element, said instrument having a movable member, which, when said instrument is so connected, is deflectable in a first direction as a function of illumination of said element, means for measuring the voltage of said source comprising: means for selectively connecting said instrument with said source to deflect said member in a second direction opposite said first direction to an extent dependent upon the voltage of said source, movable torque means adapted to oppose deflection of said member in said second direction, said torque means comprising resilient means having a reference position and being biased toward said reference position, means for magnetically attracting said resilient means toward said reference position, and means located on said deflectable member adapted to engage said resilient means and to urge said resilient means against said bias and said magnetic attraction when said member is deflected in said second direction, and scale and pointer means, one of which is movable in response to deflection of said deflectable member in said second direction for indicating the voltage of said source.

11. A device for measuring an input signal proportional to a variable quantity and for measuring the electrical potential of a source of electrical potential, comprising an electrical measuring instrument having a means movable in opposite directions from a reference position respectively through first and second operating ranges, said movable means being movable throughout said first range in response to the input signal proportional to the variable quantity, means for connecting said source in electric circuit with said instrument for deflecting said movable means into said second operating range beyond one end of said first range, whereby said movable means is positionable within said second range as a function of the potential of said source independent of said variable quantity, resilient means ineffective to influence movement of said movable means whenever said movable means is in said first range and rendered operable only upon deflection of said movable means into said second range to differentially resist said deflection, and means for indicating the position of said movable means in said second range.

References Cited by the Examiner
UNITED STATES PATENTS

| 2,597,188 | 5/1952 | Rozett | 324—115 X |
| 2,897,447 | 7/1959 | Clarke | 324—113 |
| 2,973,699 | 4/1961 | Nerwin | 95—10 X |
| 3,023,665 | 3/1962 | Estes | 95—10 |
| 3,072,036 | 1/1963 | Hoffman | 95—64 |

FOREIGN PATENTS

| 1,235,184 | 5/1960 | France. |
| 1,056,470 | 4/1959 | Germany. |

NORTON ANSHER, *Primary Examiner.*

EMIL G. ANDERSON, *Examiner.*